United States Patent
Markovic et al.

(10) Patent No.: US 8,696,461 B2
(45) Date of Patent: Apr. 15, 2014

(54) AUTOMATED SENSOR DRIVEN MATCH-MAKING

(75) Inventors: Relja Markovic, Seattle, WA (US); Stephen Latta, Seattle, WA (US); Kevin Geisner, Mercer Island, WA (US); A. Dylan Vance, Redmond, WA (US); Brian Scott Murphy, Seattle, WA (US); Matt Coohill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 181 days.

(21) Appl. No.: 13/151,134

(22) Filed: Jun. 1, 2011

(65) Prior Publication Data

US 2012/0309534 A1  Dec. 6, 2012

(51) Int. Cl.
| | | |
|---|---|---|
| A63F 9/24 | (2006.01) | |
| A63F 13/00 | (2006.01) | |
| G06F 17/00 | (2006.01) | |
| G06F 19/00 | (2011.01) | |
| A63F 13/12 | (2006.01) | |
| A63F 13/06 | (2006.01) | |
| A63F 13/10 | (2006.01) | |

(52) U.S. Cl.
CPC ............... *A63F 13/12* (2013.01); *A63F 13/00* (2013.01); *A63F 13/06* (2013.01); *A63F 13/10* (2013.01)
USPC .............................................. 463/37; 463/42

(58) Field of Classification Search
CPC ......... A63F 13/00; A63F 13/06; A63F 13/10; A63F 13/12
USPC .................................................. 463/31–33, 37
See application file for complete search history.

(56) References Cited

U.S. PATENT DOCUMENTS

| | | | |
|---|---|---|---|
| 7,614,955 B2 | 11/2009 | Farnham et al. | |
| 7,677,970 B2 | 3/2010 | O'Kelley et al. | |
| 2004/0152519 A1* | 8/2004 | Wang et al. | 463/42 |
| 2006/0121990 A1 | 6/2006 | O'Kelly II, et al. | |
| 2007/0173323 A1 | 7/2007 | Johnson et al. | |
| 2007/0270209 A1 | 11/2007 | Moshal | |
| 2008/0220870 A1 | 9/2008 | Zavolas et al. | |
| 2009/0215533 A1 | 8/2009 | Zalewski et al. | |
| 2009/0325709 A1 | 12/2009 | Shi | |
| 2010/0195867 A1 | 8/2010 | Kipman et al. | |

OTHER PUBLICATIONS

Krumm, et al., "Multi-Camera Multi-Person Tracking for EasyLiving", Retrieved at <<http://citeseerx.ist.psu.edu/viewdoc/download;jsessionid=E71CE05454E54E9E57ECDBED1D1FE131?doi=10.1.1.86.2891&rep=rep1&type=pdf>>, Third IEEE International Workshop on Visual Surveillance, Jul. 1, 2000, pp. 1-8.

(Continued)

*Primary Examiner* — Kevin Y Kim
(74) *Attorney, Agent, or Firm* — Micah Goldsmith; Glen Johnson; Micky Minhas

(57) ABSTRACT

A method of matching a player of a multi-player game with a remote participant includes recognizing the player, automatically identifying an observer within a threshold proximity to the player, using an identity of the observer to find one or more candidates to play as the remote participant of the multi-player game, and when selecting the remote participant, choosing a candidate from the one or more candidates above a non-candidate if the candidate satisfies a matching criteria.

20 Claims, 9 Drawing Sheets

(56) References Cited

OTHER PUBLICATIONS

Kangjuan., "XBOX Kinect, Kinect Sensor with Kinect Adventures!, Christmas gifts in 2010", Retrieved at <<http://hubpages.com/hub/XBOX-Kinect-Kinect-Sensor-with-Kinect-Adventures-Christmas-gifts-in-2010>>, Retrieved Date: Mar. 1, 2011, pp. 2.

"International Search Report", Mail Date: Jan. 3, 2013, Application No. PCT/US2012/040312, Filed date: May 31, 2012, pp. 9.

* cited by examiner

_US 8,696,461 B2_

AUTOMATED SENSOR DRIVEN MATCH-MAKING

BACKGROUND

In multi-player game play, different players may be matched together to participate in a game according to various matchmaking approaches. In one approach, players with comparable skill levels are matched in a game to compete against each other. For example, two players with "beginner" skill levels may be matched against one another to foster even competition. In another approach, players with similar self-described game play styles or attitudes are matched together in competitive or cooperative game play. For example, players with a "hardcore" gaming style may be matched together in one game, whereas players with a "casual" gaming style may be matched together in a different game. However, in these approaches, a player is typically matched with strangers that provide an uncertain entertainment experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of matching a player of a multi-player game with a remote participant includes identifying an observer in proximity to the player, such as through sensors operatively coupled with a computing device. The identity of the observer, including various attributes and associations, can be used to find candidates to match with the player in the multi-player game to create matches with a higher likelihood of creating a positive entertainment experience through social connection.

DETAILED DESCRIPTION

Figure 1:
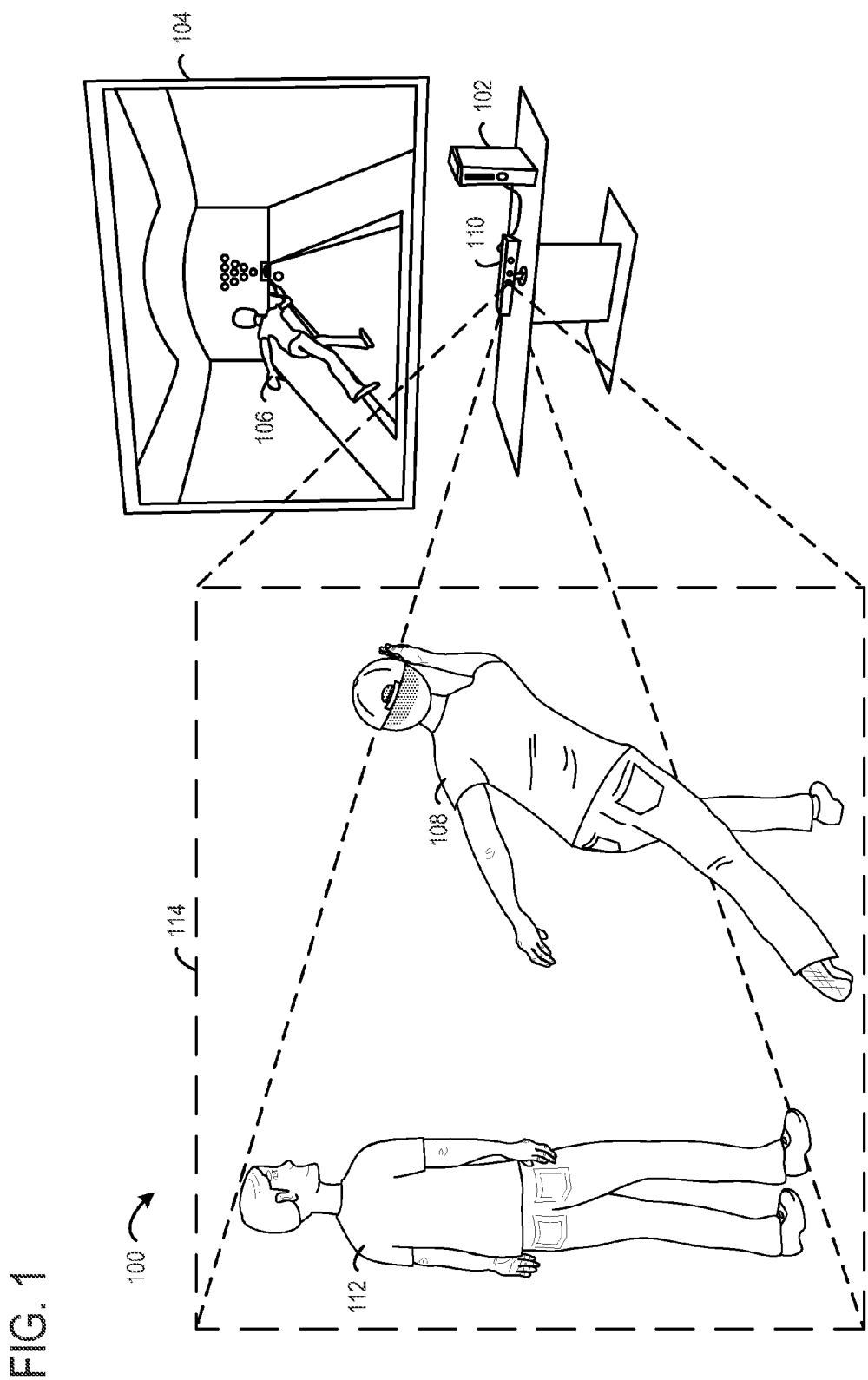
FIG. 1 shows a sensor analysis system viewing an observed scene in accordance with an embodiment of the present disclosure.

Typically, entertainment experiences can be enhanced through the involvement of multiple participants. In particular, by sharing an entertainment experience between multiple participants social interaction may occur and social connections can be demonstrated.

In some cases, real-world interactions and connections may not be suitably represented in a social network environment. For example, although a player may regularly participate in an entertainment experience (e.g., a multi-player game) with other participants that are real-world friends of the player, the player's social network service friend group may not be linked with the entertainment experience and may not include the other participants. Instead, the participants may only be added to the player's social network service friend group through manual addition by the player. Accordingly, unless the player manually adds individuals to the friend group, which may be a laborious process, the player's friend group may only partially represent the social connections of the player in the real-world.

Furthermore, in some entertainment experiences multiple participants can be purposefully matched together to participate in the entertainment experience. Some approaches for matching include matching participants with similar skill sets and/or similar styles. However, these approaches do not take into consideration any social connection between the participants. Accordingly, matched players are typically strangers. Since the matched participants are strangers and have no social connection, social interaction may be inhibited and the entertainment experience may be less than optimal.

The present description is related to creating connections based on observed interactions between participants of an entertainment experience. More particularly, the present description is related to methods and processes for leveraging sensor technology to identify the participants of an entertainment experience in order to create connections.

In some cases, a connection may be permanent. For example, participants observed interacting with a player during play of a multi-player game can be identified from sensor information streams, and the identities can be used to automatically populate or augment a social network service friend group of the player. Accordingly, the player's social network service friend group can be populated or augmented in an automated fashion to facilitate creation of a more robust friend group. Once a new friend is automatically added in this fashion, the player may fully interact with the newly added friend using any of the interaction modalities provided by the social network service. In other words, the newly added friend has the same social status as the friends that were manually added.

In some cases, a connection may be temporary. For example, a player of a multi-player game and an observer in proximity to the player can be identified from sensor information streams, and the identity of the observer can be used to find a candidate to play as a remote participant with the player in the multi-player game. Accordingly, a player can be matched with a remote participant that is more closely connected than a stranger, which increases the likelihood of an enhanced entertainment experience of the player. However, in this case, the candidates are not necessarily added as friends to the player's social network service friend group.

The methods and processes described herein may be tied to a variety of different types of computing systems. FIG. 1 shows a non-limiting example of a sensor analysis system 100 in the form of a gaming system 102, a display device 104, and one or more sensors 110. The display device 104 may be operatively connected to the gaming system 102 via a display output of the gaming system. For example, the gaming system may include an HDMI or other suitable display output. Likewise, the one or more sensors 110 may be operatively connected to the gaming system 102 via one or more sensor inputs. As a nonlimiting example, the gaming system 102 may include a universal serial bus to which a depth camera may be connected.

The sensor analysis system 100 may include one or more sensors 110 capable of observing a scene 114 including one or more game players, game observers, or other computer users. In particular, each sensor may be operable to generate an information stream of recognition information that is representative of the observed scene 114, and the information streams may be interpreted and modeled to identify each of the players, observers, users, etc. In particular, FIG. 1 shows the gaming system 102 that may be used to play a variety of different games, play one or more different media types, and/or control or manipulate non-game applications and/or operating systems. FIG. 1 also shows the display device 104 in the form of a television or a computer monitor, which may be used to present game visuals to game players and game observers. As one example, display device 104 may be used to visually present a virtual avatar 106 that is controlled by observed movements of a game player 108. The sensor analysis system 100 includes one or more sensors 110 that identifies, monitors, or tracks the game player 108 in the observed scene 114. Furthermore, the one or more sensors 110 identifies, monitors or tracks an observer 112 that is in proximity to the game player 108.

Figure 2:
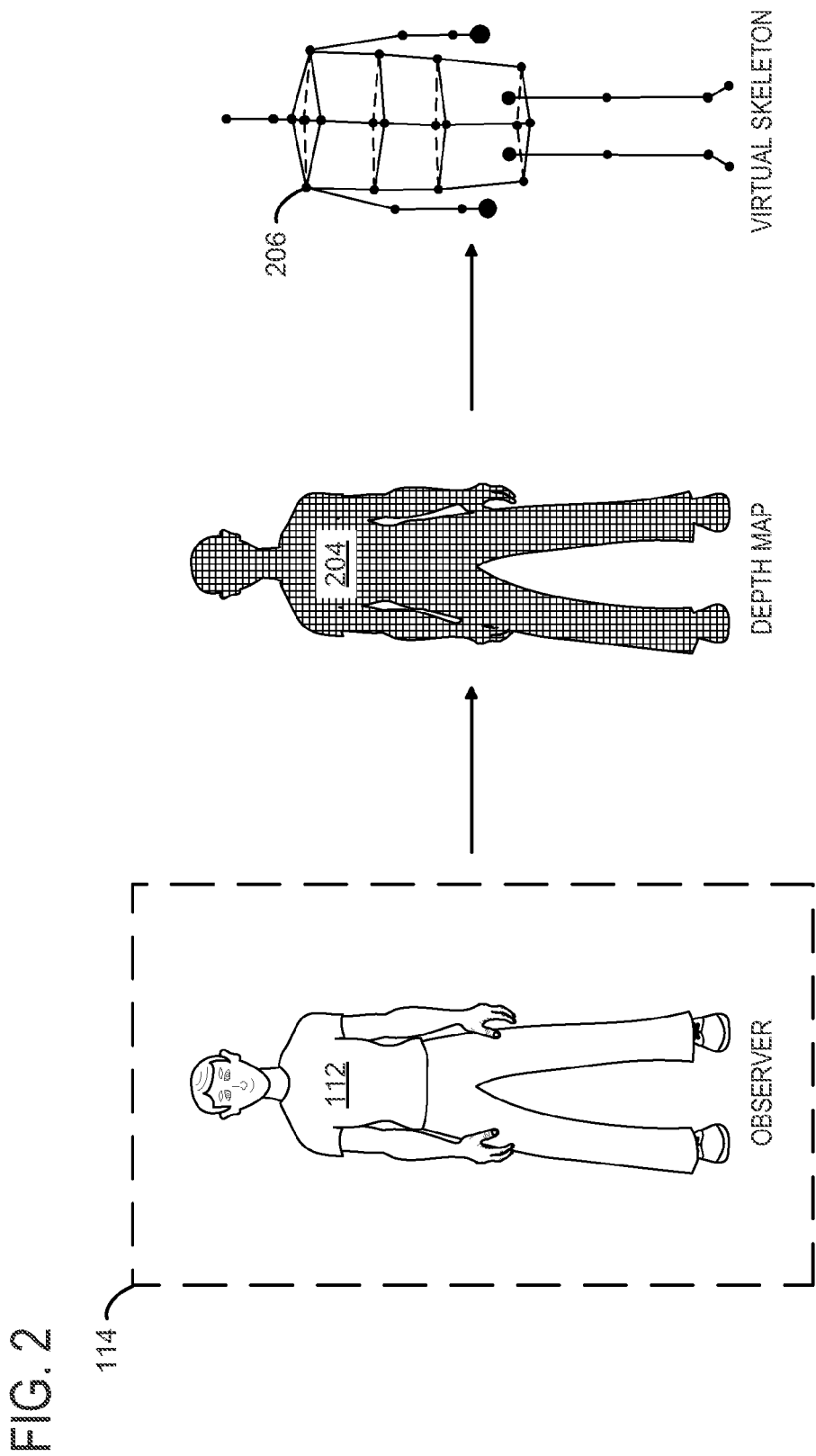
FIG. 2 schematically shows a skeletal model being derived from three-dimensional depth data.

FIGS. 2-5 show examples of how different sensors may be implemented to identify the observer 112 and/or the game player 108. FIG. 2 shows a simplified processing pipeline in which the observer 112 is modeled as a virtual skeleton 206 that can be matched with a profile skeletal model of the observer to automatically identify the observer 112. It will be appreciated that a processing pipeline may include additional steps and/or alternative steps than those depicted in FIG. 2 without departing from the scope of this disclosure.

As shown in FIG. 2, the three-dimensional appearance of observer 112 and the rest of observed scene 114 may be imaged by a depth camera (e.g., sensors 110 of FIG. 1). The depth camera may determine, for each pixel, the three dimensional depth of a surface in the observed scene 114 relative to the depth camera. Virtually any depth finding technology may be used without departing from the scope of this disclosure.

The three dimensional depth information determined for each pixel may be used to generate a depth map 204. Such a depth map may take the form of virtually any suitable data structure, including but not limited to a matrix that includes a depth value for each pixel of the observed scene. In FIG. 2, the depth map 204 is schematically illustrated as a pixilated grid of the silhouette of the observer 112. This illustration is for simplicity of understanding, not technical accuracy. It is to be understood that a depth map generally includes depth information for all pixels, not just pixels that image the observer 112.

A virtual skeleton 206 may be derived from the depth map 204 to provide a machine readable representation of the observer 112. In other words, the virtual skeleton 206 is derived from depth map 204 to model the observer 112. The virtual skeleton 206 may be derived from the depth map 204 in any suitable manner. In some embodiments, one or more skeletal fitting algorithms may be applied to the depth map. The present disclosure is compatible with virtually any skeletal modeling techniques.

The virtual skeleton 206 may include a plurality of joints, and each joint may correspond to a portion of the observer 112. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

The observer 112 may be modeled by the virtual skeleton 206, and the virtual skeleton 206 can be used to identify the observer 112. For example, the virtual skeleton 206 may be distinctive to the observer 112 and may be matched to a profile skeletal model that is included as part of a user profile of the observer 112 in a social network service. Distances between joints (i.e., "bone" lengths), ratios of two or more bone lengths, movement patterns, and other qualities may be saved as part of a profile skeletal model, which can be used to match the observer.

Figure 3:
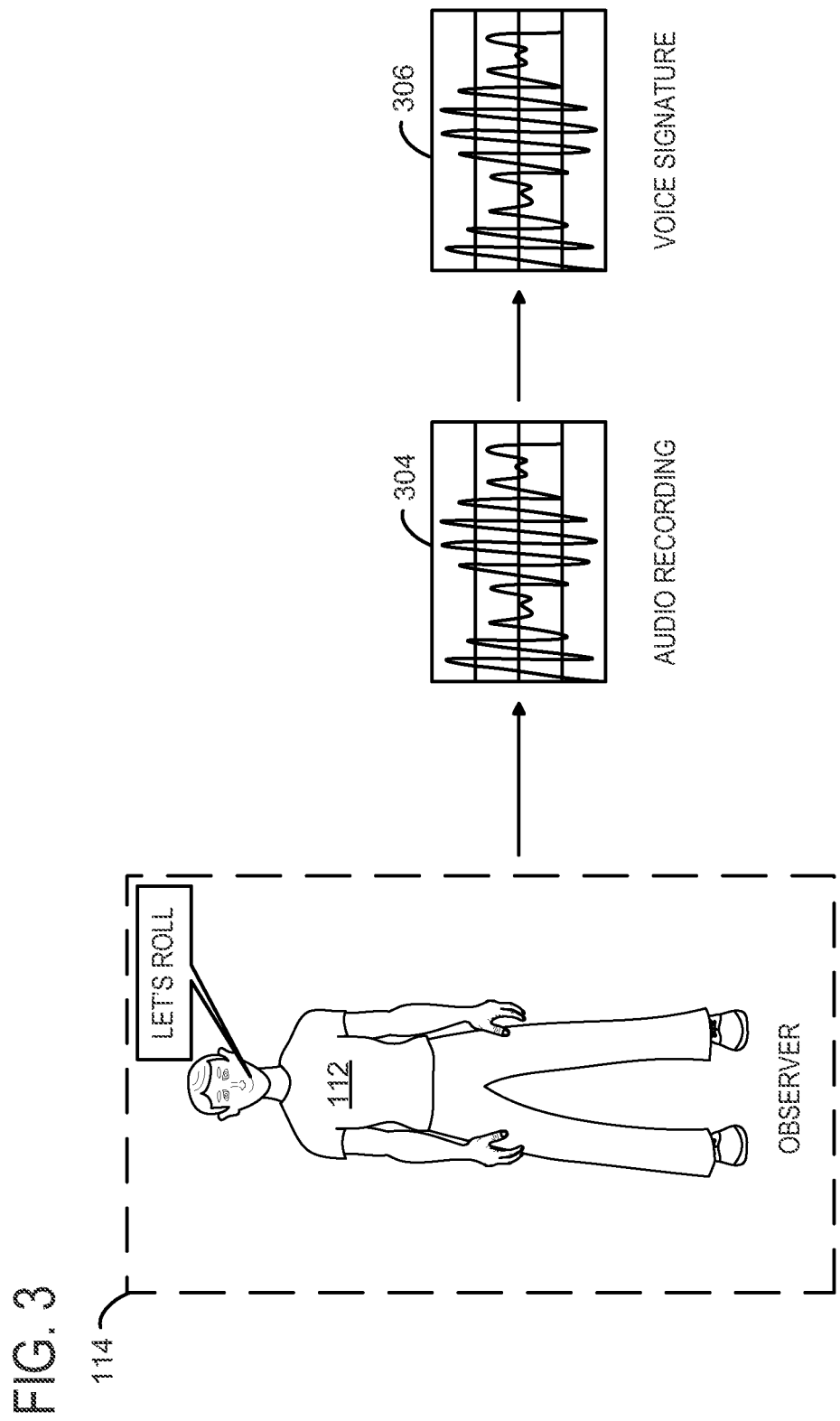
FIG. 3 schematically shows a voice signature being derived from an audio recording.

FIG. 3 shows a simplified processing pipeline in which the observer 112 is modeled as a voice signature 306 that can be used to automatically identify the observer 112. It will be appreciated that a processing pipeline may include additional steps and/or alternative steps than those depicted in FIG. 3 without departing from the scope of this disclosure.

As shown in FIG. 3, the sound of an observer 112 and the rest of observed scene 114 may be captured as an audio recording 304 by a microphone. Virtually any audio recording and analysis technology may be used without departing from the scope of this disclosure. In the illustrated example, the observer 112 speaks the phrase "Let's Roll," which is captured as the audio recording 304. The audio recording 304 is schematically illustrated as a wave of varying amplitude on a grid.

A voice signature 306 may be derived from the audio recording 304 to provide a machine readable representation of the voice of the observer 112. In other words, the voice signature 306 is derived from the audio recording 304 to model the voice of the observer 112. The voice signature 306 may be derived from the audio recording 304 in any suitable manner. The present disclosure is compatible with virtually any voice modeling techniques.

The observer 112 may be modeled by the voice signature 306, and the voice signature 306 can be used to identify the observer 112. For example, the voice signature 306 may be distinctive to the observer 112 and may be matched to a profile voice signature that is included as part of a user profile of the observer 112 in a social network service.

Figure 4:
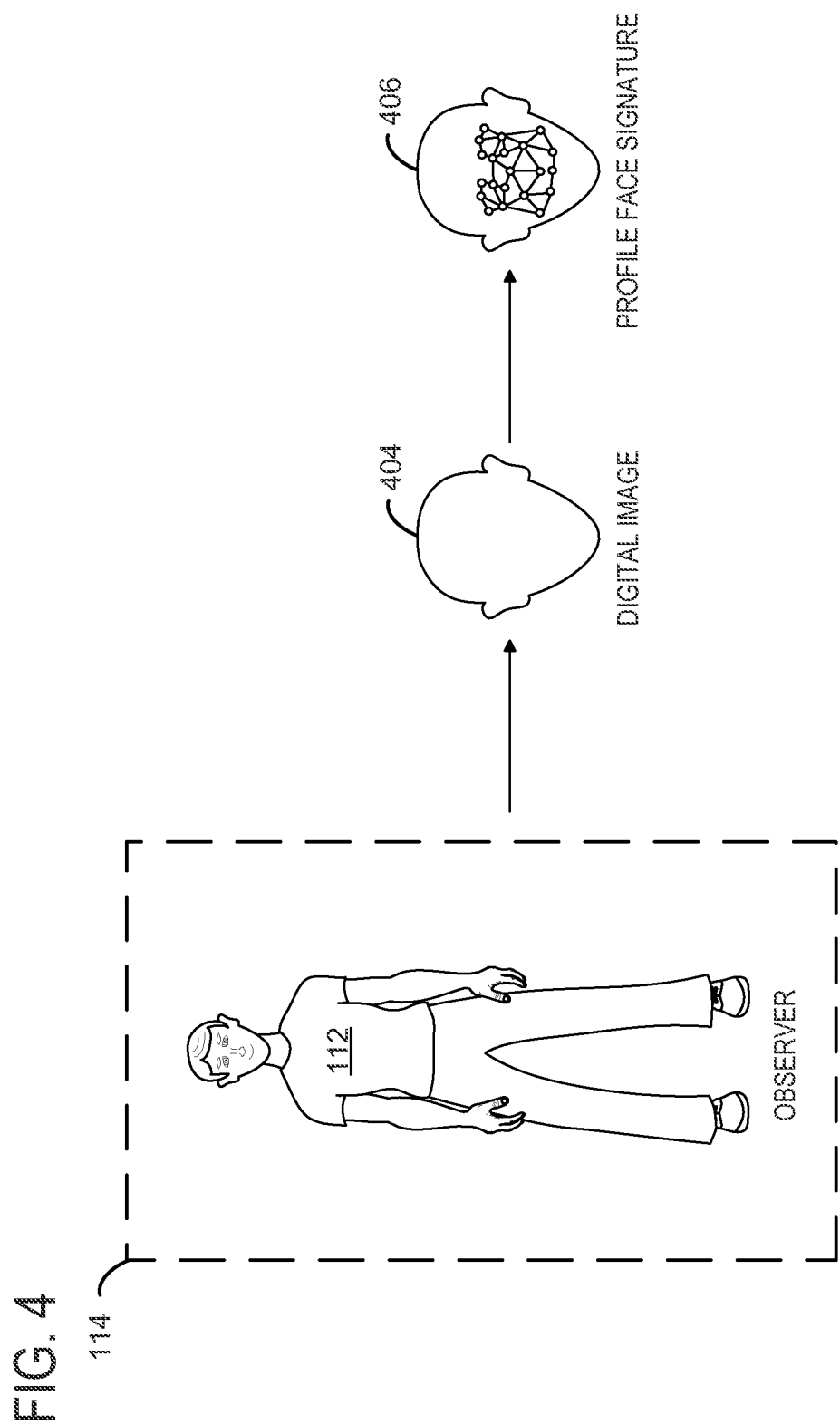
FIG. 4 schematically shows a face signature being derived from a digital image.

FIG. 4 shows a simplified processing pipeline in which the observer 112 is modeled as a face signature 406 that can be used to automatically identify the observer 112. It will be appreciated that a processing pipeline may include additional steps and/or alternative steps than those depicted in FIG. 4 without departing from the scope of this disclosure.

As shown in FIG. 4, the appearance of observer 112 and the rest of observed scene 114 may be imaged by a camera. Virtually any imaging technology may be used without departing from the scope of this disclosure. The imaging camera 402 may generate an observed facial image 404.

In FIG. 4, the observed facial image 404 is schematically illustrated as a profiled silhouette of the face of the observer 112. This illustration is for simplicity of understanding, not technical accuracy. A face signature 406 may be derived from the observed facial image 404 to provide a machine readable representation of the observer 112. In other words, the face signature 406 is derived from observed facial image 404 to model the observer 112. The face signature 406 may be derived from the observed facial image 404 in any suitable manner. The present disclosure is compatible with virtually any facial image modeling techniques.

Figure 5:
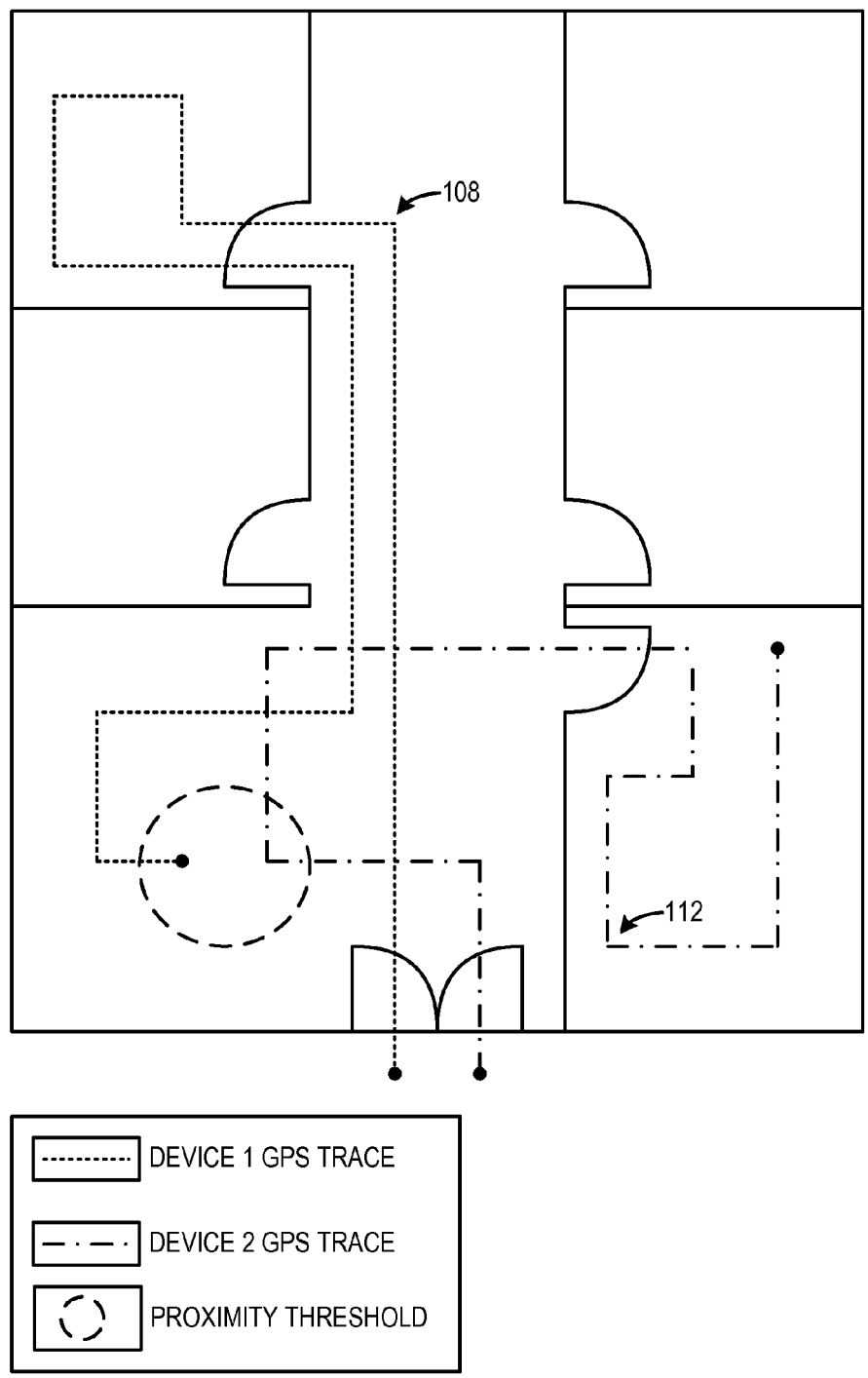
FIG. 5 schematically shows reported global positioning system (GPS) location traces of mobile computing devices associated with different individuals being tracked to determine if the individuals are in proximity to each other.

The observer 112 may be modeled by the face signature 406, and the face signature 406 can be used to identify the observer 112. For example, the face signature 406 may be distinctive to the observer 112 and may be matched to a profile face signature that is included as part of a user profile of the observer 112 in a social network service. Distances between facial features (e.g., eyes, mouth, etc.), face shape, skin tone, and other qualities may be saved as part of a profile face signature, which can be used to match the observer FIG. 5 schematically shows reported global positioning system (GPS) location traces of mobile computing devices associated with different individuals that have opted in to such tracking. The location traces may be used to determine if the individuals' location traces are in proximity to each other. In particular, the GPS location traces correspond to mobile computing devices associated with the player 108 and the observer 112. Each mobile computing device may have a reported mobile device identifier that can be sent to other computing devices (e.g., a central server and/or peer devices) to report the location or presence of the mobile computing device. Furthermore, a user may have one or more profile mobile device identifiers that may be associated with mobile computing devices that the user operates or is associated with. The profile mobile device identifiers may be included as part of a user profile of a social network service and/or an online gaming service, as nonlimiting examples. Reported mobile device identifiers may be matched to a profile mobile device identifier to identify the location of a mobile device and correspondingly the associated user.

In FIG. 5, locations of the player 108 and the observer 112 may be derived from GPS locations reported by the mobile device identifiers. In particular, the location of the player 108 traced over time is indicated by a dotted line and the location of the observer 112 traced over time is indicated by a dot-dashed line. The reported GPS locations of the mobile devices may be used to judge whether a distance between the observer 112 at a first time and the player 108 at the same or a different time satisfies a threshold proximity. In FIG. 5, the threshold proximity is indicated by a dashed circle. It is to be understood that the threshold proximity may be virtually any distance without departing from the scope of the present disclosure.

In some cases, the player 108 and the observer 112 may be judged to be within the threshold proximity at the same time. In some cases, the player 108 and the observer 112 may be judged to be within the threshold proximity at different times. In either case, if the threshold proximity is satisfied, the player 108 and the observer 112 may be made friends (automatically or through recommendation) and/or the proximity information may be used to identify candidates for matching other remote participants with the player 108 in an entertainment experience.

Note the above described sensor implementations are merely examples, and it should be understood that virtually any suitable technology may be employed to recognize players and/or observers in virtually any suitable manner without departing from the scope of this disclosure.

Figure 6:
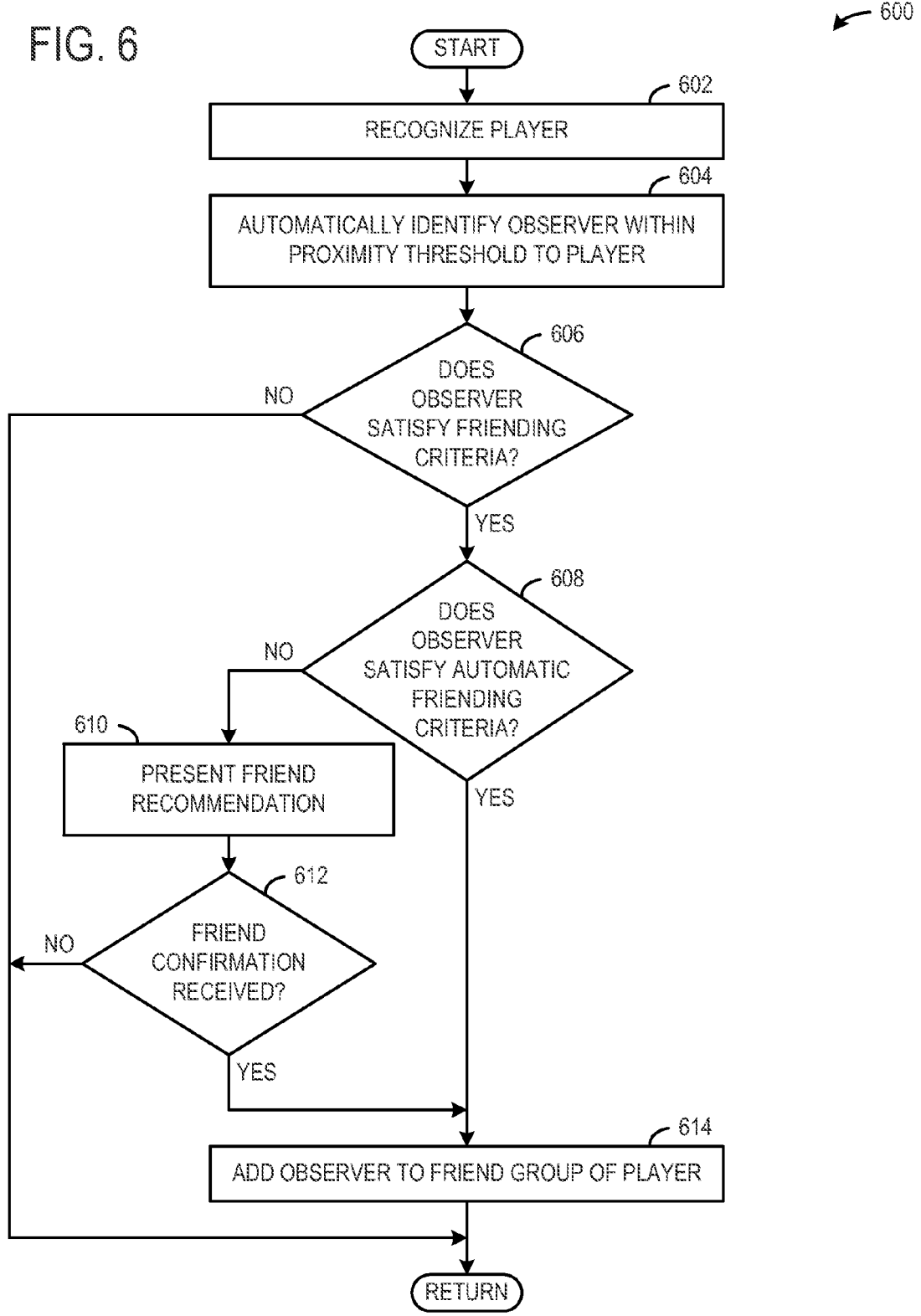
FIG. 6 shows an embodiment of a method of finding a new social network service friend for a player.

FIG. 6 shows an embodiment of a method 600 of finding a new social network service friend for a player. In one example, the method 600 may be executed by a computing device 900 shown in FIG. 9. At 602, the method 600 includes recognizing the player. In some cases, the player may be recognized through a login process to a game console in which a user profile of the player is associated with the game console. In some cases, the player may be recognized based on recognition information received from one or more sensors (e.g., as described below with reference to the observer).

At 604, the method 600 includes automatically identifying an observer within a threshold proximity to the player. In some case, the observer may be identified based on recognition information received from one or more sensors. Any suitable mechanism for identifying the observer may be used without departing from the scope of this disclosure—e.g., facial recognition, voice recognition, skeletal recognition, device recognition (e.g., mobile phone), and/or any others.

As one nonlimiting example, a depth camera may generate three dimensional depth information of the observer from which an observed skeletal model may be derived and matched to a profile skeletal model of the observer that is included as part of a user profile of the observer. As another example, a microphone may generate an audio recording of the observer's speech, from which an observed voice pattern may be derived and matched to a profile voice signature of the observer that is included as part of a user profile of the observer. As another example, an imaging camera may generate a digital image, from which an observed facial image of the observer may be derived and matched to a profile face signature of the observer that is included as part of a user profile of the observer. As another example, a GPS sensor may generate a reported mobile device identifier including a GPS location of a mobile device that is matched with a profile mobile device identifier that is included as part of a user profile of the observer.

In some cases, the observer may be judged to be within the threshold proximity of the player, if the observer and the player are both captured by one or more sensors. For example, the observer may be judged to be within the threshold proximity of the player, if the observer and the player are both captured in the same depth image generated by a depth camera. As another example, the observer may be judged to be within the threshold proximity of the player, if the observer and the player are both captured in an audio recording generated by a microphone. As another example, the observer may be judged to be within the threshold proximity of the player, if the observer and the player are both captured in a digital image generated by an imaging camera. As another example, the observer may be judged to be within the threshold proximity of the player, if a mobile device of the observer and a mobile device of the player report locations that are within a proximity threshold distance.

At 606, the method 600 includes determining if the observer satisfies friending criteria of the player. As an example, the friending criteria may be satisfied if the observer is not already a player-accepted friend of the player. As another example, the friending criteria may be satisfied if the observer and the player have been captured within the proximity threshold by the one or more sensors a threshold number of times. In some cases, the friending criteria may be set by the player in the user profile or in another configuration file. In some cases the friending criteria may be set automatically without input from the player.

In some cases, friending criteria may include a weighting algorithm that measures different characteristics of the observer to determine if the observer is suitable to be added to the player's friend group. For example, in a situation where multiple observers are identified in proximity to the player (e.g., via a depth sensor/camera), an observer that is recognized as actively interacting with the player, such as playing a multiplayer game, may be judged to have a stronger correlation or a higher ranking to be added to the player's friend group. On the other hand, another observer that is recognized as not interacting with the player, such as just sitting in the background watching, may be judged to have a weaker correlation or a lower ranking than the active observer.

As another example, observed visual characteristics that the player and the observer have in common may be considered in the weighting algorithm. For example, if the player and the observer are observed wearing clothing that has the same sports team, rock group, brand name, etc., then the observer's correlation may be stronger or ranking may be higher.

As another example, the observed interaction between the player and the observer can be considered in the weighting algorithm. For example if the player and the observer are judged to be having fun interacting together (e.g., both individuals are identified as smiling or heard laughing), then it can be judged that the interaction is positive and the observer's ranking can be increased. Alternatively or additionally, if the player and the observer are observed playing together often, then the observer's ranking can be increased. On the other hand, if the player and the observer are judged to not be enjoying the interaction (e.g., identified as having upset faces, frowns, negative verbal statements), then the observer's ranking may be decreased.

As indicated at 608, an observer may be added as a friend without further player intervention, or the observer may be recommended to the player so that the player can decide whether to add the observer as a friend. In some embodiments, a player may specify if friends are to be automatically added or recommended. In some embodiments, one or more parameters may be used to judge on a case-by-case basis whether a particular observer is to be automatically added or recommended. As a nonlimiting example, an observer that is briefly observed within proximity to a player may be recommended, while an observer that is repeatedly observed with a player for long durations of game play may be automatically added. As another example, an observer that is friends with other friends of the player on a social network service may be automatically added, while an observer that is not friended with any of the observer's friends may only be recommended. As such, at 608, method 600 includes assessing whether the observer satisfies automatic friending criteria. If the observer satisfies the automatic friending criteria, the method 600 moves to 614. Otherwise, the method 600 moves to 610.

At 610, the method 600 includes presenting a friend recommendation for the observer. In some cases, the friend recommendation is presented to the player for confirmation. In some cases, the friend recommendation is presented to a parent of the player for confirmation. For example, the friend recommendation may be presented to the parent of the player if parental controls that limit the exposure of the player to others are set for the player.

In some implementations, the friend recommendation may be expanded to include additional individuals that have similar characteristics and/or are connected with the observer and the player. For example, if the player plays a multiplayer game often with any member of a friend group or an extended "friends of friends" group of the observer and those individuals are not in the player's friend group, then such individuals may be included in a friend recommendation that is presented to the player.

In some implementations, the friend recommendation may be driven by matchmaking for game play. For example, if the player plays a multiplayer game often (e.g., greater than a threshold number of games played) with the same group of individuals or is matched against an individual often and those individuals are not in the player's friend group, then such individuals may be included in a friend recommendation that is presented to the player.

At 612, the method 600 includes determining if confirmation of the friend recommendation is received. In some cases, confirmation of the friend recommendation may be received from the player. In some cases, confirmation of the friend recommendation may be received from the parent of the player. If confirmation of the friend recommendation is received, the method 600 moves to 614. Otherwise, the observer is not added as a friend and method 600 returns to other operations.

At 614, the method 600 includes adding the observer to the friend group of the player in the social network service.

By automatically identifying the observer in proximity to the player and adding the observer to the friend group of the player if the observer satisfied the friending criteria, the player's friend group may be automatically populated or augmented without the player having to think of adding the friend. Accordingly, the friend group of the player may be made more robust in an automated fashion.

Figure 7:
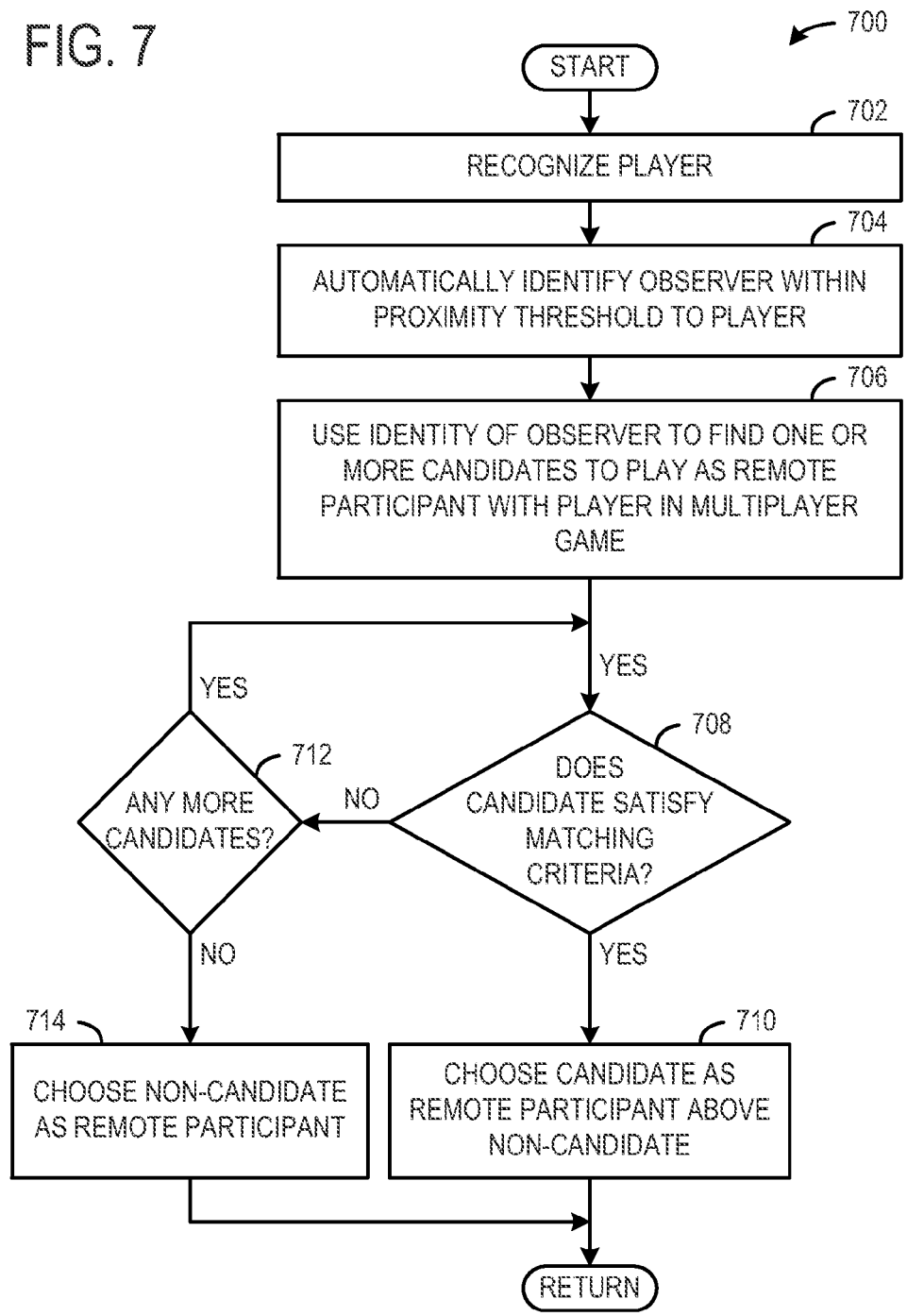
FIG. 7 shows an embodiment of a method of matching a player of a multi-player game with a remote participant.

FIG. 7 shows an embodiment of a method 700 of matching a player of a multi-player game with a remote participant. In one example, the method 700 may be executed by a computing device 900 shown in FIG. 9. At 702, the method 700 includes recognizing the player. As discussed above with reference to FIG. 6, the player may be recognized through a login process and/or based on recognition information received from one or more sensors.

At 704, the method 700 includes automatically identifying an observer within a threshold proximity to the player. As discussed above with reference to FIG. 6, the observer may be identified and judged to be within a proximity threshold based on recognition information received from one or more sensors.

At 706, the method 700 includes using an identity of the observer to find one or more candidates to play as the remote participant with the player in the multi-player game. In some cases, the identity of the observer may be used to identify observer-accepted friends as candidates. For example, people that may be "friends" of the observer on a social network server, but whom may not be friends of the player, may be identified as people with which the player could play. In some cases, friends of friends of the observer may be identified as candidates. It is to be understood that in some cases candidates may be identified based solely on degree of friend separation with the observer, and that any degree of separation may be used to form a match.

In some cases, the identity of the observer may be used to find candidates that the player is not likely to know. In other words, the attributes of the observer may be used to disqualify remote participants as candidates (e.g., friends or friends of friends disqualified). In some cases, the identity of the observer may be associated with a user profile that includes attributes of the observer that may be used to find candidates. Non-limiting examples of attributes may include home town, neighborhood, school, employer, clubs, favorite music, favorite books, favorite TV shows, associations, skill level based on a game ranking or aptitude, and the like. Such attributes may be determined via $3^{rd}$-party social network profile information, and/or gamer profile information.

In some cases, observed visual characteristics that the player and the observer have in common may be considered in finding candidates. For example, if the player and the observer are observed wearing clothing that has the same sports team, rock group, brand name, etc. or a movie or TV show poster on the wall is recognized, then other individuals that "like" the same things or share the same observed characteristics may be selected as candidates. Moreover, player and observer characteristics that are observed as well as characteristics that are stored in each of their user profiles may be filtered in aggregate to find common characteristics between the player and the observer, and individuals that share those common characteristics may be selected as candidates.

In some cases, candidates may be selected based on commonalities between the player and the observer in various social network services. For example, if both of the player and the observer are friends with users "x" and "y", and users "x" and "y" are both friends with user "z", then user "z" may be selected as a candidate because of the mutual acquaintances.

The identity of the observer may be used to find a remote participant while the observer is observing the player, and/or at any time in the future. In other words, candidates identified from one gaming session may be utilized in subsequent gaming sessions, even if the observer is no longer present.

At 708, the method 700 includes determining if a selected candidate satisfies matching criteria. As an example, matching criteria may be satisfied if a skill level of the candidate matches a skill level of the player. As another example, matching criteria may be satisfied if the candidate has a gaming style or attitude that matches a gaming style or attitude of the player. If the selected candidate satisfies the matching criteria, the method 700 moves to 710. Otherwise, the method moves to 712.

At 710, the method 700 includes choosing a candidate from the one or more candidates above a non-candidate as the remote participant to play the multi-player game with the player. If two or more candidates qualify, a variety of factors can be judged and the player may be matched with the candidate that best satisfies the criteria. For example, geographical proximity may be one criterion and musical tastes may be another, lesser rated criteria. In this example, the candidate that lives closest to the player would be selected, even if another candidate has more similar musical tastes.

At 712, the method 700 includes determining if there are any more candidates available for selection. If there any more candidates available for selection the method 700 returns to 708. Otherwise, the method 700 moves to 714.

At 714, the method 700 includes choosing a non-candidate as a remote participant to play the multi-player game with the player. A non-candidate may include a stranger that is not socially connected with the player and/or the observer. The non-candidate may be chosen if there are no candidates that satisfy the matching criteria.

By automatically identifying the observer in proximity to the player, using the identity of the observer to find one or more candidates to play as a remote participant in the multi-player game, and choosing a candidate that satisfies the matching criteria above a non-candidate, the player may be matched with a candidate the is associated with the player through connections with the observer. Accordingly, the player may have more in common or a greater social connection with the candidate relative to a stranger, and the likelihood of the player having an enhanced entertainment experience may be increased. Or, if the player desires to play a stranger, the identity of the observer can be used to eliminate potential remote participants so that the player is more likely to play somebody with no real life connections to the player.

Figure 8:
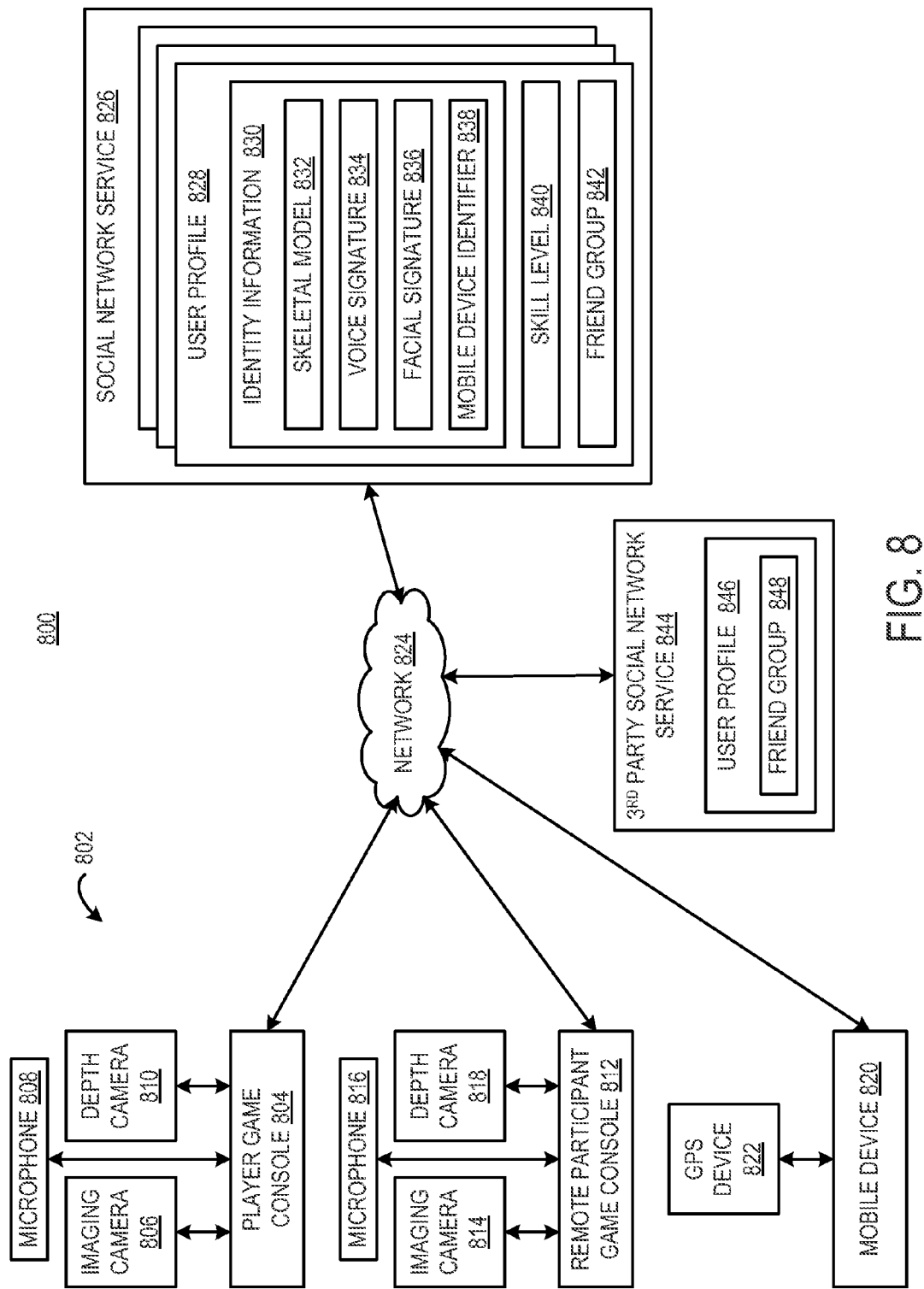
FIG. 8 shows an embodiment of a computing system in accordance with an embodiment of the present disclosure.

FIG. 8 shows an embodiment of a computing system 800 in accordance with an embodiment of the present disclosure. The above described methods and processes may be tied to the computing system 800 including one or more computers. In particular, the methods and processes described herein may be implemented as a computer application, computer service, computer API, computer library, and/or other computer program product. The computing system 800 may include a plurality of computing devices 802. Each of the plurality of computing devices may include sensors that can be used to observe a scene in order to identify a player and an observer as discussed above.

A player game console 804 that is associated with a player may receive information streams from an imaging camera 806, a microphone 808, and a depth camera 810, for example. The information streams from the sensors may be used to identify an individual in order to make connections as discussed above with reference to methods 600 and 700.

A remote participant game console 812 that is associated with a remote player may receive information streams from an imaging camera 814, a microphone 816, and a depth camera 818, for example. The information streams from the sensors may be used to identify remote individuals that may serve as remote participants in a game against the player using player game console 804.

A mobile device 820 that is associated with another remote participant may receive information from a GPS device 822. For example, the mobile device 820 may receive a GPS location from the GPS device 822. The GPS location may be included as part of a reported mobile device identifier that is used to identify the location and the user associated with the mobile device 820. In some cases, such information may be used to add the associated user as a friend, or match the associated user in a multi-player game. In some embodiments, games may be played on the mobile device, and the mobile device may include one or more sensors for identifying players and/or observers as described above.

The plurality of computing devices 802 may communicate with a social network service 826 via a network 824. The social network service 826 may include a user profile 828 for each member of the social network service 826. In one example, the user profile 828 of each social network service member may be stored in a network accessible database. The user profile 828 includes identity information 830 that defines the identity of the user associated with the user profile. For example, the identity information 830 may include a profile skeletal model 832, a profile voice signature 834, and a profile facial signature 836 that models the user of the user profile. Further, the identity information 830 may include a profile mobile device identifier 838 for each mobile device that is associated with the user of the user profile. The identity information 830 may be used to identify a user as a player, an observer, or a candidate in accordance with the methods described above.

In some cases, the social network service 826 may be associated with multi-player gaming. In such cases, a skill level 840 for various multi-player games that the user has played may be included as part of the user profile 828. In some cases, the skill level 840 may be used to determine if the user is a candidate for matching with a remote participant in a multiplayer game.

The user profile 828 may include a friend group 842 of user-accepted friends of the user that are members of the social network service 826. The friend group 842 may include friends that are added manually by the user as well as friends that are added automatically according to the method 600 described above. In some cases, the friend group 842 may be linked to one or more particular multi-player games. Correspondingly, membership in the particular friend group may be used to determine suitable candidates for matching in game play of one of the multi-player games.

In some cases, a $3^{rd}$-party social network service 844 may be in communication with the social network service 826 via the network 824. The 3$^{rd}$-party social network service 844 may be different from the social network service 826. For example, the social network service 826 may be associated with multi-player gaming or a particular type of multiplayer game console and the 3$^{rd}$-party social network service 844 may not be associated with multi-player gaming or the particular type of game console. The 3$^{rd}$-party social network service 844 may include a user profile 846 for each member of the 3$^{rd}$-party social network service 844. The user profile 846 may include a friend group 848 of user-accepted friends of the user that are members of the 3$^{rd}$-party social network service 844. In some cases, the social network service 826 may retrieve user profile information or friend group information of a user from the 3$^{rd}$-party social network service 844 to determine if a user is suitable for adding to the friend group 842 in the social network service 826 or for a candidate for matching in multi-player game play.

For example, a player and an observer may be identified by the social network service 826 and may not be recognized as friends in the social network service 826. However, the player and the observer may be identified as friends by the 3$^{rd}$-party social network service 844. In this case, the player and the observer may be automatically added to the friend groups in their user profiles in the social network service 826.

It will be appreciated that additional identity information, attributes, associations, and the like may be mined from the user profile 846 of the 3$^{rd}$-party social network service 844 by the social network service 826 to find new friends or candidates for matching.

Figure 9:
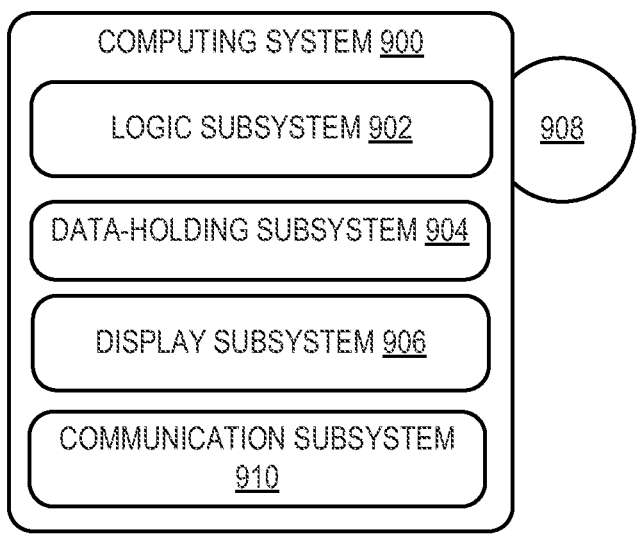
FIG. 9 shows an embodiment of a computing device in accordance with an embodiment of the present disclosure.

FIG. 9 shows an embodiment of a computing device 900 in accordance with an embodiment of the present disclosure. The computing device 900 may perform one or more of the above described methods and processes, and may serve as any of the consoles, mobile devices, or services described above with reference to FIG. 8. The computing device 900 is shown in simplified form. It is to be understood that virtually any computer architecture may be used without departing from the scope of this disclosure. In different embodiments, the computing device 900 may take the form of a mainframe computer, server computer, desktop computer, laptop computer, tablet computer, home entertainment computer, network computing device, mobile computing device, mobile communication device, gaming console, etc.

The computing device 900 includes a logic subsystem 902 and a data-holding subsystem 904. The computing device may optionally include a display subsystem 906, communication subsystem 910, and/or other components not shown in FIG. 9. The computing device 900 may also optionally include user input devices such as keyboards, mice, game controllers, cameras, microphones, and/or touch screens, for example.

The logic subsystem 902 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 902 may include one or more processors that are configured to execute software instructions. Additionally or alternatively, the logic subsystem 902 may include one or more hardware or firmware logic machines configured to execute hardware or firmware instructions. Processors of the logic subsystem 902 may be single core or multicore, and the programs executed thereon may be configured for parallel or distributed processing. The logic subsystem 902 may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem 904 may include one or more physical, non-transitory, devices configured to hold data and/or instructions executable by the logic subsystem to implement the herein described methods and processes. When such methods and processes are implemented, the state of the data-holding subsystem 904 may be transformed (e.g., to hold different data).

The data-holding subsystem 904 may include removable media and/or built-in devices. The data-holding subsystem 904 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 904 may include devices with one or more of the following characteristics: volatile, nonvolatile, dynamic, static, read/write, read-only, random access, sequential access, location addressable, file addressable, and content addressable. In some embodiments, the logic subsystem 902 and data-holding subsystem 904 may be integrated into one or more common devices, such as an application specific integrated circuit or a system on a chip.

FIG. 9 also shows an aspect of the data-holding subsystem in the form of removable computer-readable storage media 908, which may be used to store and/or transfer data and/or instructions executable to implement the herein described methods and processes. Removable computer-readable storage media 908 may take the form of CDs, DVDs, HD-DVDs, Blu-Ray Discs, EEPROMs, and/or floppy disks, among others.

It is to be appreciated that the data-holding subsystem 904 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of the computing device 900 that is implemented to perform one or more particular functions. In some cases, such a module, program, or engine may be instantiated via the logic subsystem 902 executing instructions held by the data-holding subsystem 904. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, the display subsystem 906 may be used to present a visual representation of data held by the data-holding subsystem 904. As the herein described methods and processes change the data held by the data-holding subsystem, and thus transform the state of the data-holding subsystem, the state of the display subsystem 906 may likewise be transformed to visually represent changes in the underlying data. The display subsystem 906 may include one or more display devices utilizing virtually any type of technology. Such display devices may be combined with the logic subsystem 902 and/or data-holding subsystem 904 in a shared enclosure, or such display devices may be peripheral display devices.

When included, the communication subsystem 910 may be configured to communicatively couple the computing device 900 with one or more other computing devices. The communication subsystem 910 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow the computing device 900 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing method of matching a player of a multi-player game with a remote participant, the method comprising:
recognizing the player with a computing system operatively connected with one or more sensors;
automatically identifying an observer within a threshold proximity to the player based on recognition information from the one or more sensors;
using an identity of the observer to find one or more candidates to play as the remote participant of the multi-player game; and
when selecting the remote participant, choosing a remote participant from the one or more candidates above a non-candidate if the remote participant from the one or more candidates satisfies a matching criteria, and choosing a non-candidate if none of the one or more candidates satisfies the matching criteria.

2. The method of claim 1, where automatically identifying the observer includes matching an observed skeletal model to a profile skeletal model included as part of a user profile saved in a network accessible database, the observed skeletal model being derived from three dimensional depth information collected via a depth camera imaging the observer.

3. The method of claim 1, where automatically identifying the observer includes matching an observed voice pattern to a profile voice signature included as part of a user profile saved in a network accessible database, the observed voice pattern being derived from audio recordings collected via a microphone listening to the observer.

4. The method of claim 1, where automatically identifying the observer includes matching an observed facial image to a profile face signature included as part of a user profile saved in a network accessible database, the observed facial image being derived from a digital image collected via a camera imaging the observer.

5. The method of claim 1, where automatically identifying the observer includes matching a reported mobile device identifier to a profile mobile device identifier included as part of a user profile saved in a network accessible database.

6. The method of claim 1, where using an identity of the observer to find one or more candidates includes identifying one or more members of a social network service friend group of the observer as one or more candidates.

7. The method of claim 6, where the social network service friend group is a gaming group that is linked to the multi-player game.

8. The method of claim 6, where the social network service friend group is a $3^{rd}$-party social network service friend group that is not associated with the multi-player game.

9. The method of claim 1, where the remote participant from the one or more candidates satisfies the matching criteria if a skill level of the remote participant from the one or more candidates matches a skill level of the player.

10. A computing system comprising:
one or more sensor inputs operable to receive sensor information from one or more sensors;
a logic subsystem operatively connected to the one or more sensor inputs; and
a data-holding subsystem including instructions executable by the logic subsystem to:
translate the received sensor information into recognition information for one or more users;
recognize a player;
automatically identify an observer within a threshold proximity to the player based on the sensor information;
use an identity of the observer to find one or more candidates to play as a remote participant of a multi-player game with the player; and
when selecting the remote participant, choose a remote participant from the one or more candidates above a non-candidate if the remote participant from the one or more candidates satisfies a matching criteria, and choosing a non-candidate if none of the one or more candidates satisfies the matching criteria.

11. The computing system of claim 10, where the one or more sensors includes a depth camera operable to image the observer to generate three dimensional depth information that is sent to the one or more sensor inputs; and
the data-holding subsystem includes instructions executable by the logic subsystem to:
match an observed skeletal model derived from three dimensional depth information to a profile skeletal model included as part of a user profile of the observer saved in a network accessible database.

12. The computing system of claim 10, where the one or more sensors includes a microphone operable to listen to the observer to generate audio recordings that are sent to the one or more sensor inputs; and the data-holding subsystem includes instructions executable by the logic subsystem to:

match an observed voice pattern derived from the audio recordings to a profile voice signature included as part of a user profile of the observer saved in a network accessible database.

13. The computing system of claim 10, where the one or more sensors includes a camera operable to image the observer to generate a digital image that is sent to the one or more sensor inputs; and the data-holding subsystem includes instructions executable by the logic subsystem to:

match an observed facial image derived from the digital image to a profile face signature included as part of a user profile of the observer saved in a network accessible database.

14. The computing system of claim 10, where the data-holding subsystem includes instructions executable by the logic subsystem to:

match a reported mobile device identifier of the observer to a profile mobile device identifier included as part of a user profile of the observer saved in a network accessible database.

15. The computing system of claim 10, where the data-holding subsystem includes instructions executable by the logic subsystem to:

identify one or more members of a social network service friend group of the observer as one or more candidates to play as the remote participant of the multi-player game with the player.

16. The computing system of claim 15, where the social network service friend group is a gaming group that is linked to the multi-player game.

17. The computing system of claim 15, where the social network service friend group is a $3^{rd}$-party social network service friend group that is not associated with the multi-player game.

18. The computing system of claim 10, where the remote participant from the one or more candidates satisfies the matching criteria if a skill level of the remote participant from the one or more candidates matches a skill level of the player.

19. A computing system comprising:

a depth camera input operable to receive depth information from a depth camera;

a logic subsystem operatively connected to the depth camera input; and a data-holding subsystem including instructions executable by the logic subsystem to:

translate the depth information into a skeletal model of a game player and a skeletal model of an observer;

recognize the player;

automatically identify the observer within a threshold proximity to the player by matching the observed skeletal model of the observer to a profile skeletal model included as part of a user profile of the observer;

use an identity of the observer to find one or more candidates to play as a remote participant of a multi-player game with the player; and when selecting the remote participant, choose a remote participant from the one or more candidates above a non-candidate if the remote participant from the one or more candidates satisfies a matching criteria, and choosing a non-candidate if none of the one or more candidates satisfies the matching criteria.

20. The computing system of claim 19, where the data-holding subsystem includes instructions executable by the logic subsystem to:

identify one or more members of a social network service friend group of the observer as one or more candidates to play as the remote participant of the multi-player game with the player.

* * * * *